United States Patent
Kroll et al.

(10) Patent No.: US 8,539,986 B2
(45) Date of Patent: Sep. 24, 2013

(54) HOT GAS CONDUCTING COMPONENT

(75) Inventors: Matthias Kroll, Dackenheim (DE);
Armin Buchsteiner, Sinsheim (DE)

(73) Assignee: Isolite GmbH, Ludwingshafen (DE)

( * ) Notice: Subject to any disclaimer, the term of this patent is extended or adjusted under 35 U.S.C. 154(b) by 94 days.

(21) Appl. No.: 13/274,319

(22) Filed: Oct. 15, 2011

(65) Prior Publication Data
US 2012/0103457 A1 May 3, 2012

(30) Foreign Application Priority Data
Oct. 20, 2010 (DE) .................. 10 2010 048 975

(51) Int. Cl.
*F16L 9/14* (2006.01)
(52) U.S. Cl.
USPC ........... 138/149; 138/137; 138/140; 138/138; 428/36.91
(58) Field of Classification Search
USPC ......... 138/149, 148, 138, 140, 137; 427/327, 427/36.91
See application file for complete search history.

(56) References Cited

U.S. PATENT DOCUMENTS

| 4,182,122 | A | | 1/1980 | Stratton et al. | 60/322 |
| 4,582,094 | A | * | 4/1986 | Stausebach | 138/147 |
| 4,695,516 | A | | 9/1987 | Masuhara et al. | 428/623 |
| 5,714,738 | A | * | 2/1998 | Hauschulz et al. | 219/535 |
| 5,992,560 | A | * | 11/1999 | Matsuoka et al. | 181/252 |
| 6,726,957 | B2 | * | 4/2004 | Niemiec | 427/327 |
| 2002/0066491 | A1 | * | 6/2002 | Lively | 138/149 |
| 2002/0168492 | A1 | * | 11/2002 | Madono et al. | 428/36.91 |
| 2004/0033313 | A1 | * | 2/2004 | Niemiec | 427/327 |
| 2006/0272727 | A1 | * | 12/2006 | Dinon et al. | 138/149 |
| 2009/0029147 | A1 | * | 1/2009 | Tang et al. | 428/319.1 |
| 2009/0205737 | A1 | * | 8/2009 | Dinon et al. | 138/149 |

FOREIGN PATENT DOCUMENTS

| DE | 195 36 124 A1 | 4/1997 |
| DE | 102 54 715 A1 | 6/2004 |
| DE | 10 2008 051 278 | 4/2010 |
| GB | 2464369 A * | 4/2010 |

OTHER PUBLICATIONS

W. Sobek, M. Speth, Von der Faser zum Gewebe, 1995, Deutsche Bauzeitung, db Sep. 1993, S. 74-81.

* cited by examiner

*Primary Examiner* — Patrick F Brinson
(74) *Attorney, Agent, or Firm* — Fattibene and Fattibene LLC; Paul A. Fattibene

(57) ABSTRACT

A hot gas conducting component, in particular for an exhaust system of an internal combustion engine, is described. To improve the insulation effect, an insulation to which heat-reflecting and/or heat-absorbing pigments are added is arranged at the component.

12 Claims, 1 Drawing Sheet

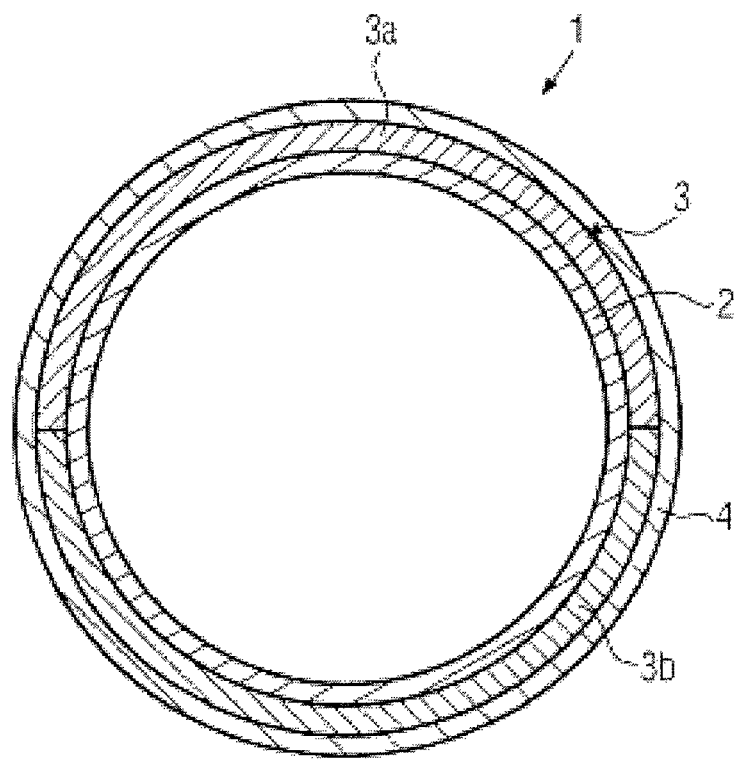

HOT GAS CONDUCTING COMPONENT

FILED OF THE INVENTION

The invention relates to a hot gas conducting component, in particular for an exhaust system of an internal combustion engine.

BACKGROUND OF THE INVENTION

Insulations for hot gas conducting components, in particular e.g. for exhaust manifolds of an internal combustion engine, are employed in multifarious constructions. For example, DE 10 2008 051 278 shows an exhaust system for internal combustion engines, in particular an exhaust manifold, which employs an insulating air space for thermal insulation that can be evacuated by means of a vacuum pump.

Insulating molded bodies pressed from nonwoven material are also employed.

Insulations must fulfill various tasks, in particular in the exhaust system of internal combustion engines for motor vehicles. On the one hand, they should protect the surrounding components from heat radiation, and on the other hand, they should ensure that subsequent components, for example turbochargers or catalysts, are quickly heated to their operating temperatures when the engine is started.

SUMMARY OF THE INVENTION

The object underlying the invention is to provide improved thermally effective insulation.

This object is achieved by the features of a hot gas conducting component with insulation to which heat-reflecting and/or heat absorbing pigments are added.

BRIEF DESCRIPTION OF THE DRAWING

The FIGURE is a cross section of a hot gas conducting component.

DETAILED DESCRIPTION OF THE PREFERRED EMBODIMENT

By the inventive addition of pigments, the thermal insulation properties can be selectively changed. By pigments, the weight of the insulation is not extremely increased, which is important in particular when it is employed in motor vehicles, nor is the thickness of the insulation and thus the required space in the engine enlarged. Pigments or mixtures, respectively, can still be employed especially for the intended application, and optionally also limited to a specific region, and optionally purposefully selected with respect to the radiation spectrum. By the addition of pigments, heat absorption and heat reflection can be influenced such that on the one hand the surrounding components are protected from thermal overload, and on the other hand care is taken that, when the internal combustion engine is started, an increase in the exhaust energy is quickly achieved, resulting in a quick increase in temperature in the exhaust pipe during the warm-up time, and thereby in a reduction of $NO_x$ values and $CO_2$ emission.

Depending on the intended application, for example, heat reflecting or heat absorbing pigments or mixtures of them can be employed.

Preferably, a fiber mat of mineral fibers, such as glass and/or silicate and/or ceramic fibers, is used as an insulation mat.

The fiber mat can be a nonwoven or fibrous tissue.

The pigments can be located on the inner and/or outer surface of the insulating mat.

Preferably, the insulating mat is present as an insulating molded body that was solidified by a binder and shaped as desired, preferably by hot-pressing. In this case, the pigments are preferably added to the binder.

Embodiments of the invention will be illustrated below with reference to the single drawing which shows a cross-section through a hot gas conducting component according to the invention.

In the FIGURE, a hot gas conducting component 1 in the form of a tube is represented which can be, for example, part of an exhaust system of an internal combustion engine, in particular an exhaust manifold (exhaust temperatures between 400° C. and 1600° C.). The component 1 contains an inner tube 2 of a conventional material, for example of a cast metal or a sheet metal or the like. At the outer surface of the inner tube 2, an insulation 3 is applied which can be covered to the outside by a covering 4. In the represented embodiment, the insulation 3 is assembled from two half bowls 3a and 3b which are both embodied as insulating mats or, preferably since particularly effective, as an insulating molded body.

The insulating molded body is each manufactured from a blank of an insulating mat which was mixed with binder and shaped as desired by hot pressing.

As insulating mat, usually nonwovens of mineral fibers, for example glass fibers or silicate fibers or ceramic fibers, are employed. For the invention, however, woven fibrous tissues of these fibers can also be employed. Particularly preferred is a standard mat in the form of a silicate fiber mat Sinamat® having a thickness of 8 mm and 960 g/m². Powermat® having a thickness of 8 mm or 12 mm, respectively, and 900 g/m² or 1200 g/m², respectively, (not preshrunk) can also be employed. Another preferred material is a silicate fibrous tissue mat (twisted) Hakoterm® 1200 HG 1350.

As a binder, bentonite suspended in water or another suited alumina is usually employed.

According to the invention, the insulation contains pigments or particles. The pigments can be applied by spreading them onto the insulating mat or in any other way. Preferably, the pigments are, however, admixed to the binder and applied onto one or both sides of the fiber mats together with the binder suspended in water.

The pigments or particles are preferably color pigments which can also be used for dyes. These can be purposefully selected for the special intended purpose. As spectral properties of color pigments are known, they can be especially selected by their spectral properties, in particular in the infra-red range. In particular, the reflecting and absorbing properties are important.

For example, black color pigments can be employed where temperature equalization or maintaining a certain temperature is important. Reflecting color pigments, for example in yellow or white, can be employed where it is a matter of reflecting heat back to the heat transfer medium. However, both have the effect that, for example, exhaust gas can be quickly brought to the required operating temperature for subsequent components (for example a turbocharger or a catalyst) after the engine was started.

As a black, heat-absorbing pigment, a copper chromite black spinell, e.g. "Black 30C965" of the company "The Shepherd Color Company" in particular proved to be suited. Moreover, BK0030C965; C.I. Pigment Black 28; C.I. Constituation #77428; CPMA #13-38-9 are suited.

"YELLOW 193®" of the same company proved to be suited as heat-reflecting pigment. This yellow color pigment contains a buff rutile on the basis of chrome, antimony and titanium (chrome antimony titanium buff rutile).

Other mineral pigments can also be employed.

For the manufacture, the pigments are preferably mixed with the binder on one or both sides in predetermined quantitative proportions, where mixing ratios of three parts of binder (alumina/bentonite and water) with one part of pigments proved themselves.

After mixing, the binder mixed with pigments was applied onto the fiber mat and formed to the preferably self-supporting insulating body in a heated stamping press. Subsequently, the molded bodies are fixed to the component, where the color pigments abut against the outer or the inner surface.

In variation to the described and drawn embodiment, the pigments can be applied onto the insulating mat like a coat of painting or directly introduced into the insulating mat in a different way. The invention is not only suited for the exhaust manifold, but also for other hot gas conducting components.

What is claimed is:

1. Hot gas conducting component (1), in particular for an exhaust system of an internal combustion engine, with an insulation (3) arranged at the component (1) to which heat-reflecting and/or heat-absorbing color pigments are added;
   wherein the insulation is present as an insulating molded body (3) solidified by binder;
   wherein the color pigments are added to the binder; and
   wherein the heat-absorbing color pigments comprise black color pigments comprising a copper chromite black spinell and the heat-reflecting color pigments comprise yellow color pigments comprising a buff rutile on the basis of chrome, antimony and titanium.

2. Hot gas conducting component according to claim 1, wherein:
   the pigments are color pigments.

3. Component according to claim 1, wherein the insulation is a fiber mat of mineral fibers, such as glass and/or silicate and/or ceramic fibers.

4. Component according to claim 1, wherein the insulation is a nonwoven fibrous tissue.

5. Component according to claim 1, wherein the insulation is a woven fibrous tissue.

6. Component according to claim 1, wherein the pigments are located on the inner and/or outer surface of the insulation.

7. Insulating molded body (3), in particular for a hot gas conducting component (1) of an internal combustion engine according to claim 1, having an insulating mat which is mixed with a binder and contains the added color pigments.

8. Method of manufacturing an insulating molded body according to claim 7, wherein a blank of a fiber mat is provided with a binder mixed with the color pigments and reshaped by hot pressing.

9. A hot gas conducting component for an exhaust system of an internal combustion engine comprising:
   insulation applied to the hot gas conducting component; and
   a heat reflecting and/or heat absorbing color pigment added to said insulation,
   whereby a thermally effective insulation is provided;
   wherein the insulation is present as an insulating molded body solidified by binder;
   wherein the color pigments are added to the binder; and
   wherein the heat-absorbing color pigments comprise black color pigments comprising a copper chromite black spinell and the heat-reflecting color pigments comprise yellow color pigments comprising a buff rutile on the basis of chrome, antimony and titanium.

10. A hot gas conducting component for an exhaust system of an internal combustion engine as in claim 9 wherein:
    said heat reflecting and/or heat absorbing color pigment is on the surface of the hot gas conducting component.

11. Hot gas conducting component according to claim 1, wherein:
    the black color pigments are of the type Black 30C965 and the yellow color pigments are of the type YELLOW 193.

12. A hot gas conducting component for an exhaust system of an internal combustion engine as in claim 9 wherein:
    the black color pigments are of the type Black 30C965 and the yellow color pigments are of the type YELLOW 193.

* * * * *